United States Patent [19]

Riegler et al.

[11] 3,926,481

[45] Dec. 16, 1975

[54] BEARING CONSTRUCTION FOR HEAVY MACHINES, IN PARTICULAR FOR STEEL WORKS CONVERTERS

[75] Inventors: Ernst Riegler, Enns; Manfred Schmidt, Linz, both of Austria

[73] Assignee: Vereinigte Österreichische Eisen- und Stahlwerke - Alpine Montan Aktiengesellschaft, Linz, Austria

[22] Filed: Nov. 27, 1974

[21] Appl. No.: 527,535

[30] Foreign Application Priority Data

Dec. 7, 1973 Austria .............................. 10248/73

[52] U.S. Cl. .................. 308/6 R; 308/72; 308/194; 308/207 R
[51] Int. Cl.² ...................... F16C 17/00; F16C 21/00; F16C 33/02
[58] Field of Search ............ 308/22, 25, 58, 72, 61, 308/178, 194, DIG. 8, 202, 207 R, 212, 214, 238, 3 R, 6 R, 6 B, 6 A

[56] References Cited
UNITED STATES PATENTS
1,837,415  12/1931  Dull ................................ 308/207 R

| | | |
|---|---|---|
| 3,160,449 | 12/1964 | Scott..................... 308/72 |
| 3,291,541 | 12/1966 | Dellinger............................ 308/6 R |
| 3,291,542 | 12/1966 | North................................ 308/6 R |
| 3,350,144 | 10/1967 | Beckman et al.................... 308/6 R |

FOREIGN PATENTS OR APPLICATIONS

| | | |
|---|---|---|
| 1,016,831 | 9/1952 | France ............................... 308/212 |
| 429,193 | 5/1926 | Germany ........................... 308/202 |
| 431,471 | 7/1926 | Germany ........................... 308/202 |

*Primary Examiner*—Robert S. Ward, Jr.
*Attorney, Agent, or Firm*—Brumbaugh, Graves, Donohue & Raymond

[57] ABSTRACT

A bearing construction for heavy machines, in particular for steel works converters, having trunnions borne in self-aligning bearings, such as slide-, articulation-, or self-aligning roller bearings. One bearing is fixed in relation to the foundation and the other bearing is movable. The movable bearing rests with a lower housing part provided with a cylindrical roll-off surface on a horizontal foundation plate. The invention constitutes a solution to the problem of accommodating axial movements of a bearing trunnion affected by thermal expansion.

12 Claims, 5 Drawing Figures

BEARING CONSTRUCTION FOR HEAVY MACHINES, IN PARTICULAR FOR STEEL WORKS CONVERTERS

The invention relates to a bearing construction for heavy machines, in particular for steel works converters, having trunnions borne in self-aligning bearings, such as slide-, articulation-, or self-aligning roller bearings, wherein one bearing is fixed in relation to the foundation and the other bearing is movable.

In the fields of general engineering, or gear making, respectively, it is customary to mount a shaft in a fixed bearing on one side and in an expansion bearing on the other side, so that it can accommodate thermal expansion or assembly inaccuracies, respectively, and in order to guarantee smooth operation.

In a converter, too, the carrying ring together with the vessel is usually mounted in a fixed bearing and in an expansion bearing. There are different embodiments for the expansion bearing construction, as e.g. a sliding bushing construction according to Austrian Patent Specification 274,870. For improving the axial movability the outer periphery of the axially displaceable sliding bushing may be coated with a bronze layer enhancing the sliding ability, respectively a bronze sheet may be adhered to said outer periphery. In converters having a closed carrying ring this measure has in general proved to be sufficient; because an axial displacement on account of thermal expansion occurs only over a longer period of time, for instance within 10 to 14 days.

In open, e.g. horseshoe-shaped carrying rings, for converter exchange plants, however, an axial displacement of the bearing by ± 15 mm has to occur during each revolution on account of the excentrically acting load. As a consequence thereof the lubricating film between sliding bronze layer and fixed bushing is being interrupted within a very short time. Thus the coefficient of friction increases, which entails an increase of the axial forces necessary for the displacement. This increase of the axial forces causes an increased stress in the open carrying ring and constitutes a danger for the operational reliability of the plant.

The invention aims at avoiding the above mentioned disadvantages and difficulties and it is its object to find a new solution to the problem of accommodating axial movements of a bearing trunnion affected by thermal expansion, without constructing the outer race of the bearing displaceable in relation to the inner race; i.e. so that it is possible to construct the bearing itself equal to the fixed bearing. According to the invention this task is solved in a bearing construction of the above described type in that the movable bearing rests with a lower housing part or with a housing support, respectively, provided with a cylindrical roll-off surface on a horizontal foundation plate.

Preferably the part carrying the roll-off surface and the foundation plate consist of hardened steel.

According to a preferred embodiment of the invention the center of the roll-off surface coincides with the center of the bearing.

Another preferred feature of the invention consists in that the roll-off movement of the lower housing part or of the support, respectively, is guided between vertical ledges of the foundation plate, which ledges preferably consist of bearing metal.

In order that the invention may be more fully understood an embodiment thereof will now be described in more detail by way of example with reference to the accompanying drawings in which.

Figure 1:
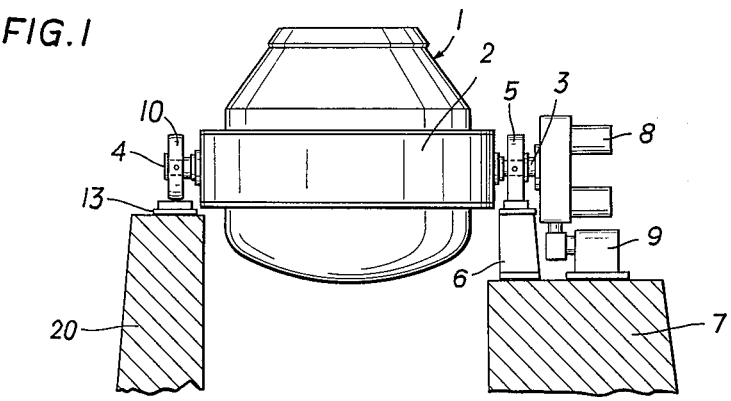
FIG. 1 is general view of the converter together with its bearing construction.

In FIG. 1 the converter is denoted with 1, the carrying ring with 2, the fixed bearing trunnion arranged on the side of the drive with 3 and the axially movable trunnion on the opposite side is denoted with 4. The fixed bearing trunnion 3 is supported in the bearing via the support 6 by the foundation 7. Said fixed bearing trunnion carries an attachable gear 8 and is fixed by the torque support 9. The movable bearing 10 is carried by a lower housing part 11, whose foot is provided, according to the invention, with a cylindrical, i.e. semicylindrical roll-off surface 12. The lower housing part 11 rests with this roll-off surface 12 on a horizontal foundation plate 13. The roll-off surface and the foundation plate are suitably made of high-tensile, hardened steel. The lower housing part 11 provided with the roll-off surface is guided laterally by upward projecting ledges 14; on their inner side there is a greased layer 15 of bearing metal, preferably of bronze. The foundation plate is secured to the foundation by means of screws 16.

Figure 2:
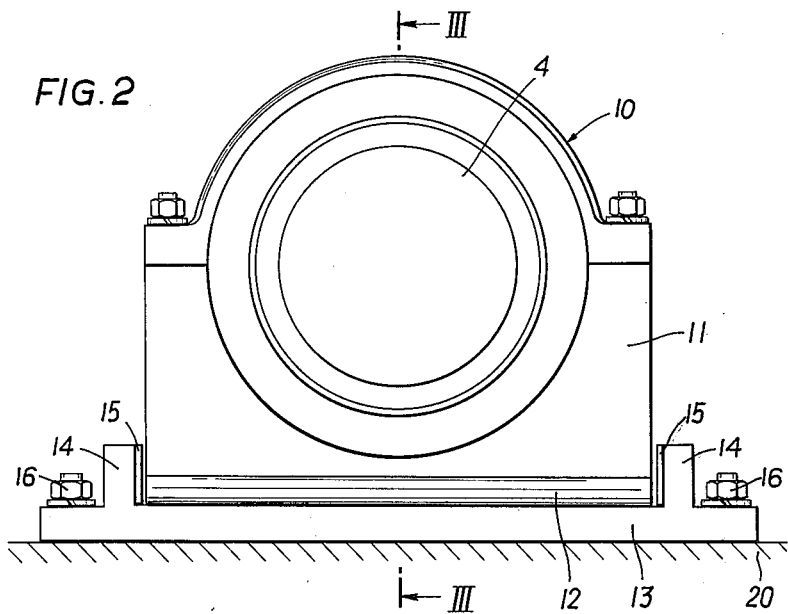
FIG. 2 is a front view of the movable bearing.
Figure 3:
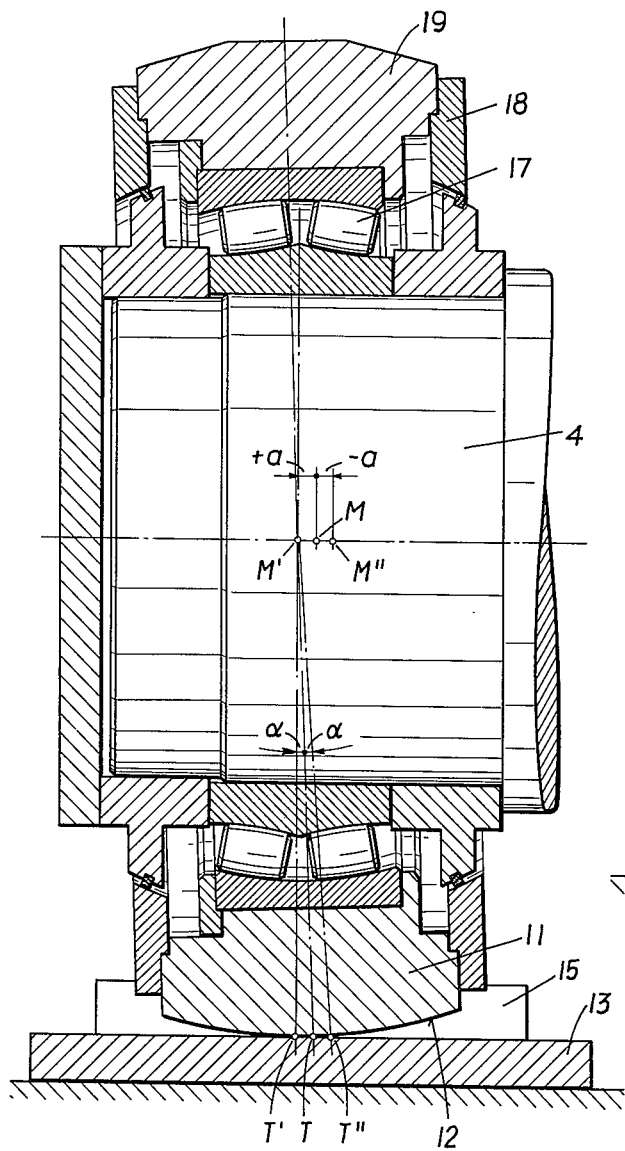
FIG. 3 represents a section of the bearing along line III—III of FIG. 2.

The bearing used in the embodiment according to FIG. 2 is a self-aligning roller bearing, as can be seen from FIG. 3. By swinging out of the rollers 17 it can accommodate tumble movements of the trunnion 4 and it is self-aligning. The outer race 18 is axially not displaceable in relation to the lid 19.

Figure 4:
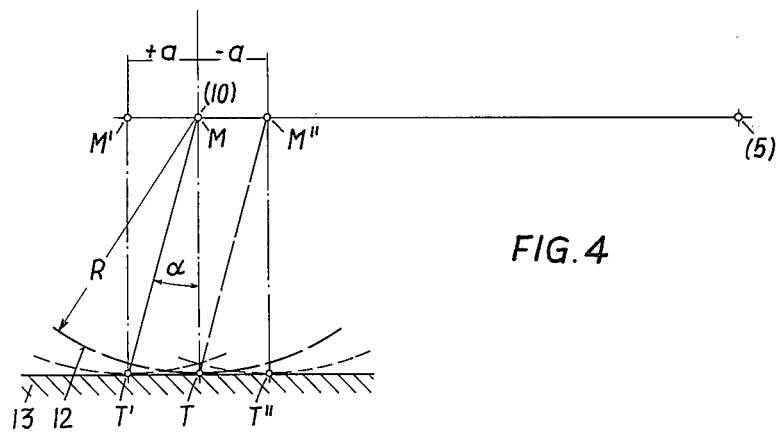
FIG. 4 illustrates the kinematics of the roll-off movement and of the axial displaceability of the bearing.

The operation of the construction of the invention and the kinematics of the movement can be observed from FIG. 4. In the original position, prior to the influence of thermal expansion, the bearing center is denoted with M. The point in which the cylindrical surface 12 rests on the foundation plate 13 is denoted with T. The center of the cylindrical surface coincides with the bearing center; the radius of the cylindrical surface is denoted with R. When the bearing is affected by thermal expansion and when there is a tendency of migrating by the distance $+a$, on the one hand the rollers 17 of the self-aligning roller bearing shift to the right and, on the other hand the cylindrical surface rolls off on the foundation plate by the angle $\alpha$, so that the center M comes to lie at M' and the resting point T migrates to position T'. In contrast thereto, at the occurrence of mechanical influences, such as a deflection, the center M of the bearing migrates in opposite direction to point M'' and the resting point T to position T''. This displacement can also be seen from FIG. 3, wherein the self-aligning roller bearing is swung out by the same angle $\alpha$ in a direction opposite to the roll-off movement.

Figure 5:
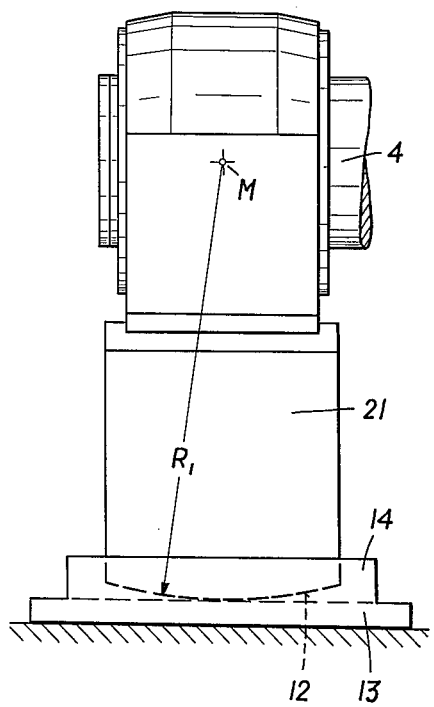
FIG. 5 shows a modified embodiment in which the lower housing part is mounted on a support.

It is obvious that the range of axial movability depends on the dimension of the radius R. So as to achieve a bigger axial displaceability the lower housing part 11 can be placed on a support, wherein the support is provided with the cylindrical roll-off surface. In this case the foundation part 20 illustrated in FIG. 1, on which the foundation plate 13 is fastened, would be placed deeper, approximately to the level of the foundation 7 and in between a support 21 would be inserted, as illustrated in FIG. 5; the radius of the roll-off surface is denoted with $R_1$.

What we claim is:

1. A bearing construction for heavy machines, in particular for steel works converters, which comprises
   — a bearing housing,
   — two trunnions borne in a self-aligning bearing each, one bearing being fixed in relation to a foundation and the other bearing being a movable bearing,
   — a lower housing part provided with a cylindrical roll-off surface and carrying out a roll-off movement, with which lower housing part the movable bearing rests on a horizontal foundation plate.

2. A bearing construction as set forth in claim 1, wherein the self-aligning bearing is a slide bearing.

3. A bearing construction as set forth in claim 1, wherein the self-aligning bearing is an articulation bearing.

4. A bearing construction as set forth in claim 1, wherein the self-aligning bearing is a self-aligning roller bearing.

5. A bearing construction as set forth in claim 1, wherein the movable bearing rests with a housing support provided with a cylindrical roll-off surface and carrying out a roll-off movement on a horizontal foundation plate.

6. A bearing construction as set forth in claim 1, wherein the lower housing part carrying the roll-off surface is made of hardened steel.

7. A bearing construction as set forth in claim 1, wherein the foundation plate is made of hardened steel.

8. A bearing construction as set forth in claim 1, wherein the roll-off surface center coincides with the bearing center.

9. A bearing construction as set forth in claim 1, wherein the roll-off movement of the lower housing part is guided between vertical ledges of the horizontal foundation plate.

10. A bearing construction as set forth in claim 9, wherein the vertical ledges are made of a bearing metal.

11. A bearing construction as set forth in claim 5, wherein the roll-off movement of the housing support is guided between vertical ledges of the horizontal foundation plate.

12. A bearing construction as set forth in claim 11, wherein the vertical ledges are made of a bearing metal.

* * * * *